Oct. 11, 1966  N. MUNRO ETAL  3,277,582
FLUIDIZED BED METHOD AND APPARATUS
Filed July 15, 1963  3 Sheets-Sheet 1

INVENTORS.
NEIL MUNRO
ROBIN G. NAUTA
BY CARL W. WESTPHAL

D. M. Messapelle
ATTORNEY.

Oct. 11, 1966 N. MUNRO ET AL 3,277,582
FLUIDIZED BED METHOD AND APPARATUS
Filed July 15, 1963 3 Sheets-Sheet 2

INVENTORS.
NEIL MUNRO
ROBIN G. NAUTA
BY CARL W. WESTPHAL

ATTORNEY.

United States Patent Office 3,277,582
Patented Oct. 11, 1966

3,277,582
FLUIDIZED BED METHOD AND APPARATUS
Neil Munro, Oakland, Calif., Robin G. Nauta, Stamford, Conn., and Carl W. Westphal, St. Augustine, Fla., assignors to Dorr-Oliver Incorporated, Stamford, Conn., a corporation of Delaware
Filed July 15, 1963, Ser. No. 295,093
6 Claims. (Cl. 34—57)

This invention relates generally to a method and apparatus for contacting solid particles with gases in a fluidized bed and more particularly to the use of special construction plate construction to supply fluidizing gas to the fluidized bed in the reactor.

Prior to this invention many varied types of tuyeres have been employed in constriction plates in an attempt to distribute fluidizing gas evenly throughout a fluidized bed of solids supported thereabove. These prior art devices had several disadvantages such as the tendency to create hot spots or surfaces on and around the tuyeres resulting in agglomeration and/or fusion of the materials handled, eventually leading to complete defluidization of the fluidized bed.

Another disadvantage of prior art devices was the tendency of the solid particles in the fluidized bed to settle into the tuyere and eventually plug the tuyere disrupting the pattern of flow of the fluidizing gas through the constriction plate.

It is, therefore, an object of the invention to provide a construction plate construction for a fluidized bed reactor which distributes the fluidizing gas uniformly over the entire area of the fluidized bed supported thereabove.

A second object of the invention is to provide a constriction plate construction for a fluidized bed reactor which prevents the sifting of solids into the tuyeres.

A further object of the invention is to provide a constriction plate construction for a fluidized bed reactor the temperature of which is maintained lower than that of comparable constriction plates to reduce the tendency of the development of hot spots and allows the use of higher fluidizing gas temperature.

A still further object of the invention is to provide a constriction plate construction which develops high gas velocities at the tuyere outlet to prevent the sifting of solid particles into the tuyeres.

A fifth object of the invention is to provide a constriction plate construction which maintains the temperature of the constriction plate far below the temperature of the hot windbox and at the same time provides high gas velocities at the tuyere outlets to prevent sifting of the solid particles into the tuyeres thereby preventing agglomeration and/or fusion of the fluidized solid particles and possible defluidization of the fluidized bed supported thereabove.

A still further object of the invention is to provide a method of using a fluidized bed reactor which eliminates the creation of hot spots around the tuyeres in the constriction plate and prevents the passage of solid particles into the tuyeres.

Other objects and advantages of the invention will be clearly apparent as the specification proceeds to describe the invention with reference to the accompanying drawings, in which.

Figure 1:
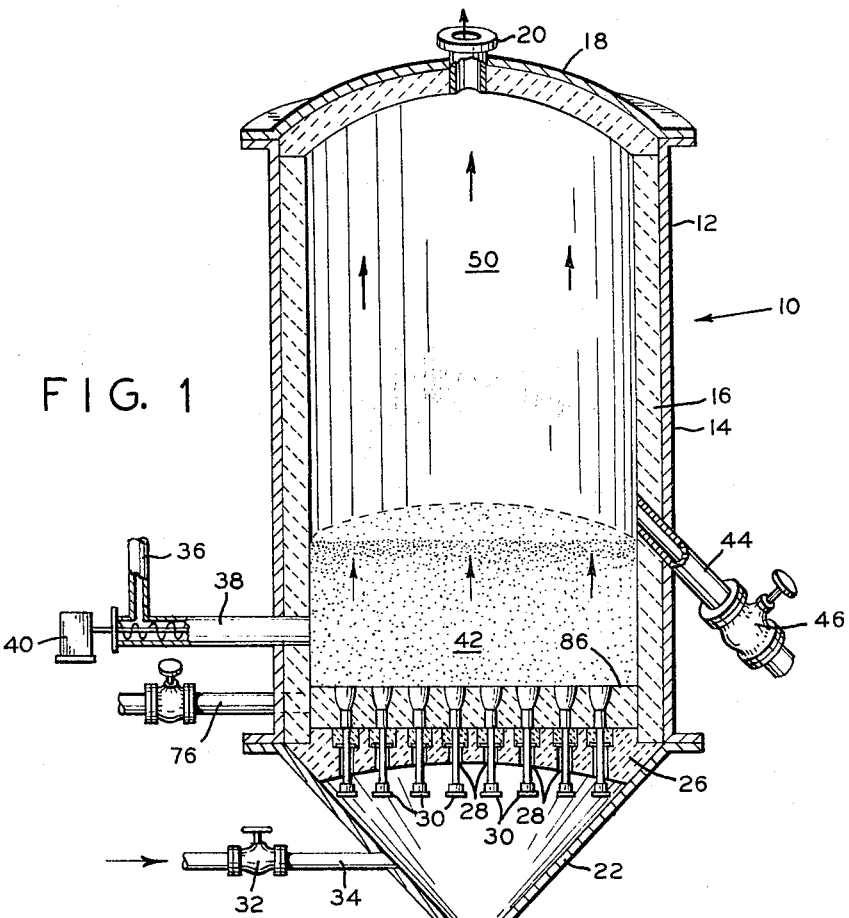
FIG. 1 is a cross-sectional view of a typical fluidized bed reactor encompassing our new and improved constriction plate.
Figure 2:
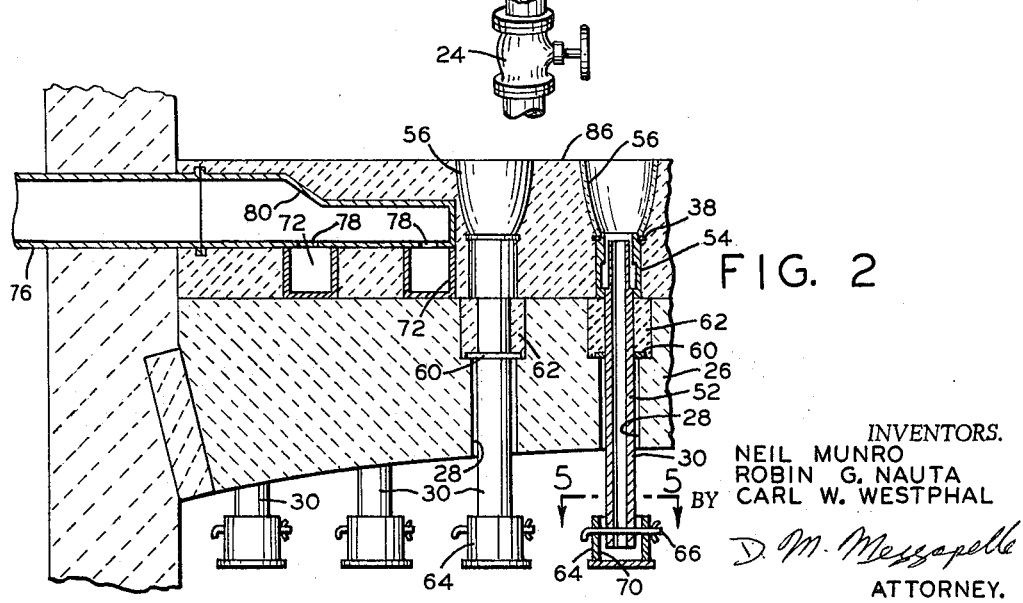
FIG. 2 is an enlarged cross-section view taken in line 2—2 of FIGURE 3.
Figure 3:
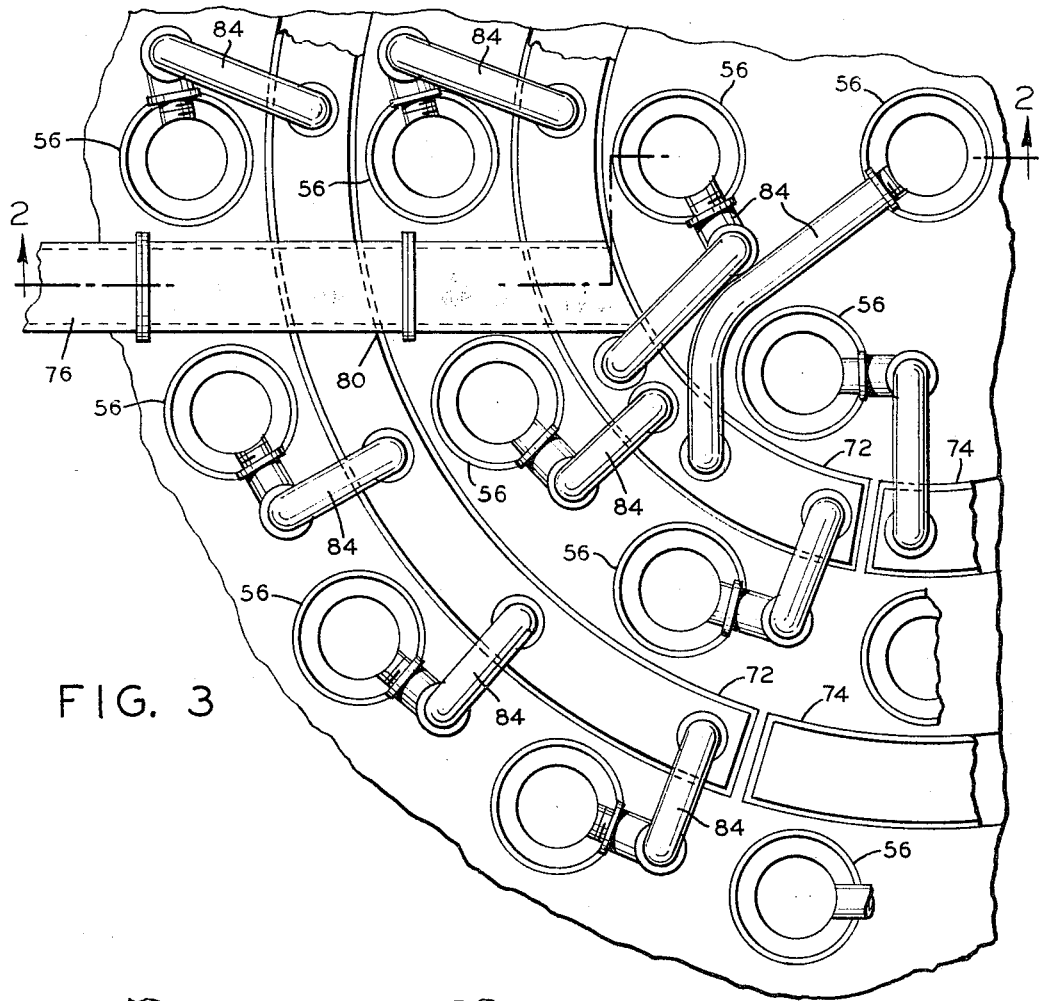
FIG. 3 is a partial schematic top view of the air manifold arrangement for the air cooling of the tuyeres with a portion of the ceramic cups broken away.
Figure 4:
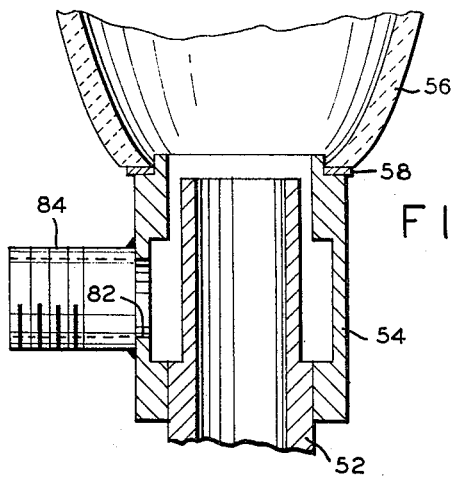
FIG. 4 is a blown up cross-sectional view showing in detail the upper portion of the tuyeres shown in FIGS. 1 and 2.
Figure 5:
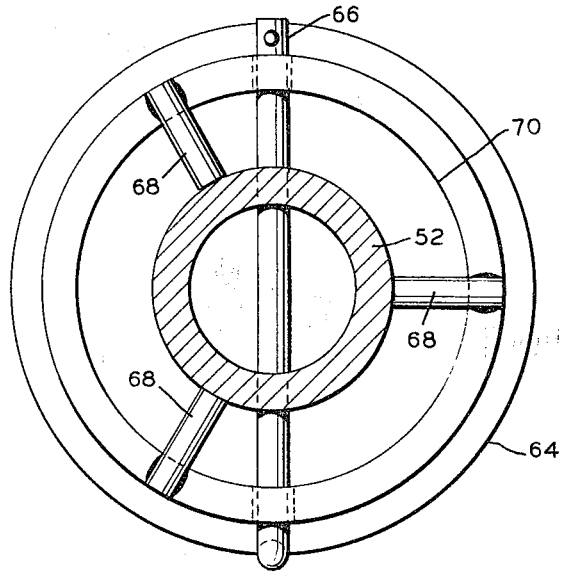
FIG. 5 is an enlarged cross-section view taken on line 5—5 of FIGURE 2.
Figure 6:
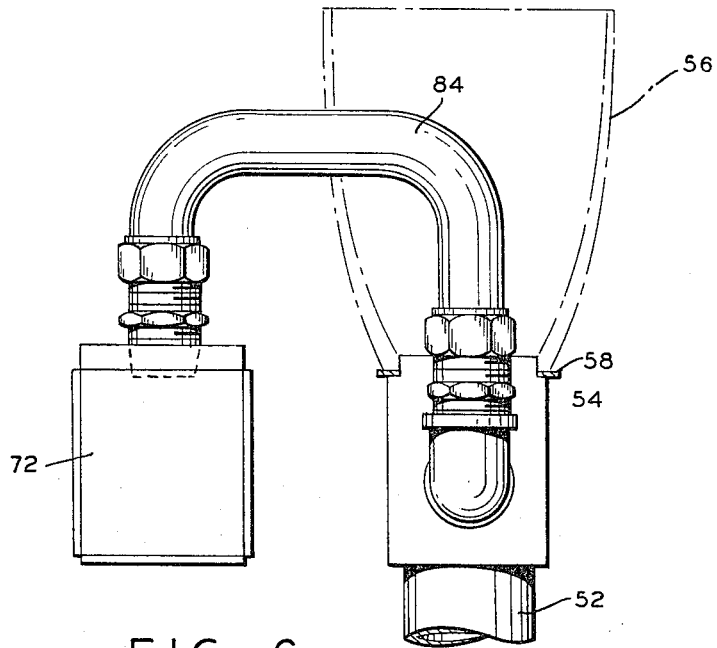
FIG. 6 is an enlarged view showing the connection of the air manifold to the tuyeres.

Looking now to FIG. 1 there is shown a reactor 10 comprising a cylindrical section 12 having a metallic outer wall 14 and lined with refractory material 16. The reactor has a top 18 with a gas discharge conduit 20. A windbox or coned section 22 having valved cleanout conduit 24 is provided at the reactor bottom.

Located in the bottom of cylindrical section 12 and extending throughout its cross-sectional area is a solids supporting constriction plate consisting of an arched dome section 26 having a substantially flat upper surface 86 constructed of a suitable refractory material. Said constriction plate is provided with gas admitting apertures 28 into which tuyeres 30 are fitted. The construction of tuyeres 30 will be hereinafter described.

In operation, fluidizing air and/or treatment gas is admitted into windbox 22 via conduit 34, provided with valve 32, while solids particles, generally in a finely divided state, are introduced into cylindrical section 12 via conduit 36 and screw feeder 38 which is driven by motor 40. The incoming feed solids form bed 42, the upper level of which is controlled by overflow pipe 44 and valve 46. Above bed 48 is an overlying freeboard space 50. The bed is fluidized by the hot gas entering through the tuyeres 30 in the constriction plate.

If heat is required for start-up, such as initially starting pyrite roasting, or for continued operation then it may be supplied by preheating the gases or by internal torches or by any other well known means such as burning fuel in the bed itself.

Previous to this invention, fluidized bed reactors of the above described type were limited in their use due to the limitation on the maximum fluidizing gas temperature. As pointed out above, if the fluidizing gas temperature was too high hot spots developed, especially around the tuyeres causing agglomeration and/or fusion of the solid material and in extreme cases causing defluidization of the bed. At the same time it is necessary for the inlet fluidizing gas temperatures to be higher than the average desired temperatures in the bed. In many roasting and/or drying operations, the most efficient bed temperature desired was not obtainable since the necessary temperature of the inlet fluidizing gas was so high as to cause numerous undesirable hot spots. Therefore, a compromise temperature was employed which resulted in lowered efficiency of the fluidized bed.

Looking now more particularly at FIGS. 2–6 there is shown in detail a new and novel constriction plate construction which not only allows the use of fluidizing gas at higher temperatures but also prevents sifting of solid particles into the tuyeres.

Tuyeres 30 basically consist of an inner pipe member 52 for the flow of fluidizing gas therethrough, an outer annular pipe member 54 for the flow of cooling air, and a cup member 56 mounted on annular pipe members 54 to provide an area of high velocity at the tuyere outlet. Preferably, cup member 56 is ceramic but it is within the scope of the invention to use any desired material which has a low coefficient of thermal conductivity. An annular gasket 58 is provided between ceramic cup member 56 and the pipe member 54 to allow for differential thermal expansion. Tuyere 30 is suspended within the openings 28 in the arch dome section 26 of the constriction plate by an annular flange 60 on the inner pipe member 52 which abuts the bottom of enlarged opening 62 in the dome section of the constriction plate. It can readily be seen that an annular space is left between the wall of the opening 28 and the inner pipe member 52 so that the portion of pipe member 52 which has the hottest fluidizing gas therein does not directly contact the arch dome section 26 of the constriction plate in order to reduce the heat transfer between the constriction plate and the hot fluidizing gas.

An annular cup member 64 is attached to the bottom of inner pipe member 52 by pin member 66 or other suitable means and spaced therefrom by spacers 68 welded or otherwise secured to the inner wall 70 of cup member 64. Annular cup member 64 provides a restricted annular opening into the inner pipe member 52 for the flow of fluidizing gas in order to allow the gas pressure to build up in windbox 22 so that fluidizing gas will be equally distributed to each of the tuyeres 30. Annular cup member 64 also acts to prevent any solids that sift into the tuyere during a sudden shutdown from being delivered into the windbox 22.

Located on top of the arch dome section 26 of the constriction plate is a plurality of air manifolds to provide a supply of cooling air for tuyeres 30. Preferably, each air manifold is divided into two sections 72 and 74. The number of such sections is not restricted to two since obviously other numbers of sections can be used depending on the size of the reactor, number of tuyeres desired, etc. A cooling inlet conduit 76 is provided through the wall of reactor 10 to supply cooling air to the air manifold. A valved inlet conduit 76 is mounted upon the air manifold sections 72 and 74 with apertures 78 provided therein to supply air into the air manifold sections. One inlet conduit 76 is transitioned at 80 to compensate for the air being delivered to the outer annular air manifold. Cooling air is delivered to the interior of outer pipe member 54 through aperture 82 via pipe sections 84. The particular arrangement of pipe sections 84 depends upon the design of the reactor and the air manifold and does not form a part of the invention. Tuyeres 30, air manifold sections 72 and 74, and valved air inlet conduit 76 are secured in position by placing therearound brick and/or any other suitable type of refractory material 86, castable or otherwise. Tuyeres 30 are so located so as to maintain the top of ceramic cup member 56 approximately level with the refractory material 86. Flange member 60 prevents the flow of the refractory material 86 into the windbox 22 when the tuyeres 30 are being cast into place.

In operation hot fluidizing gas flows from the windbox 22 into the inner pipe member 52. Gas, cooler in temperature than the hot fluidizing gas, is introduced into the outer pipe member 54. The cool gas in annular pipe member 54 surrounds the hot fluidizing gas issuing from inner pipe member 52 and forms a film of cool gas therearound as the gases enter the high velocity area in the ceramic cup member 56. The velocity of the gas in the ceramic cup is higher than the velocity of the gas in the fluidized bed 42 thereby preventing the sifting of fluidized material into the tuyere but allowing the coarse material to sift into the ceramic cup members. The coarse material, however, does not have a tendency to stick to the tuyere and, therefore, it is blown out by the uprising high velocity gas before they plug the tuyere. The cooling air surrounding the hot fluidizing gas tends to maintain the surrounding constriction plate at a much lower temperature. Further, the location of the air manifolds, supplying the cooling air to the tuyeres, within the constriction plate results in a constriction plate of much lower temperature due to the circulation of the cooling air therethrough. In fact, the burying of the air manifold close to the surface of the constriction plate results in a constriction plate surface temperature which tends to be close to the temperature of the fluidized bed thereby eliminating hot spots on the constriction plate surface.

Obviously we have provided a fluidized bed reactor which not only prevents the plugging of the tuyeres by sifting of the material but also allows the use of a fluidizing gas with a much higher temperature. In fact, we have found that the limitations on the temperature of the hot inlet gas is no longer applicable and that agglomeration and/or fusion of the bed materials is eliminated by suitable control of the temperature and flow of the cooling air flow and the respective velocities of the cooling air and fluidizing gas through the tuyeres.

Although we have described in detail the preferred embodiment of our invention, it will be obvious to those skilled in the art that many changes may be made without departing from the scope of the invention as defined by the appended claims.

For instance, while we have disclosed a constriction plate having a substantially flat upper surface it is to be understood, however, that the present invention also contemplates the use of a constriction plate having an arched or dome-shaped upper surface.

Therefore, it is to be understood that all matters herein set forth and as shown in the accompanying drawings are to be interpreted in an illustrative and not in a limiting sense, since the scope of the invention is defined by the appended claims rather than by the description preceding them and all changes that fall within the metes and bounds of the claims or equivalents thereof are, therefore, to be embraced by said claims.

We claim:

1. In a fluidized bed apparatus having a chamber, a constriction plate for supporting a mass of solid particles in said chamber having a plurality of apertures therein, and means for passing fluidizing gas through said apertures; said means comprising: a first conduit means in said apertures in flow communication with a source of fluidizing gas, a second conduit means in said apertures surrounding a portion of said first conduit means and forming an annular chamber therebetween, gas manifold means in said constriction plate and adjacent the top thereof, means connecting said gas manifold means to said annular chamber, means supplying a gas to said gas manifold means at a temperature less than the temperature of the fluidizing gas, a cup member mounted in said constriction plate above and adjacent said first and second conduit means, and said cup member having an open upper end and an open lower end, said cup member being positioned with its lower end in flow relationship with said first and said second conduit means and receiving gas therefrom whereby the flow of gas from said first conduit means and said second conduit means creates an area of high velocity in said cup member resisting the sifting of solids into said cup member from said mass of solid material.

2. The structure of claim 1 wherein the upper open end of said cup member is substantially flush with the top of said constriction plate.

3. The structure of claim 2 wherein the wall of said cup member has a low coefficient of thermal conductivity.

4. The structure of claim 3 wherein said cup member is mounted on said second conduit means and said second conduit means projects above said first conduit means.

5. The structure of claim 4 wherein said cup member is ceramic.

6. In a fluidized bed apparatus having a chamber, a substantially horizontally disposed plate for supporting a mass of solid particles in said chamber having a plurality of apertures therein and means for passing fluidizing gas through said apertures; said means comprising: a first conduit means in said apertures in flow communication with a source of fluidizing gas a second conduit means in said apertures surrounding at least a portion of said first conduit means and forming an annular chamber therebetween, said first and second conduit means having open upper ends, means for supplying fluidizing gas to said first conduit means at a predetermined temperature and velocity, means in said horizontally disposed plate communicating with said annular chamber for supplying cooling gas to said second conduit at a predetermined temperature and velocity, and cup means mounted above and adjacent to said upper open ends of said first and second conduit means, said cup means having an open upper end in flow communication with said mass of finely divided solids and an open lower end in flow communication with said fluidizing and cooling gas whereby said cup means provides confined concentric streams of high gas velocity which resists the sifting of fines into said first conduit means and the agglomeration of said solids.

References Cited by the Examiner

UNITED STATES PATENTS

| | | | |
|---|---|---|---|
| 2,718,096 | 9/1955 | Henry et al. | 263—21 X |
| 2,914,388 | 11/1959 | Kelley | 23—288.3 |
| 3,016,624 | 1/1962 | Bliss | 34—57 |
| 3,022,988 | 2/1962 | Corson et al. | 263—21 |
| 3,057,701 | 10/1962 | Coates et al. | 23—284 |
| 3,174,531 | 3/1965 | Walstad | 158—109 |

FREDERICK L. MATTESON, JR., *Primary Examiner.*

WILLIAM F. O'DEA, *Examiner.*

D. A. TAMBURRO, *Assistant Examiner.*